United States Patent
Claudatos et al.

(10) Patent No.: US 8,812,455 B1
(45) Date of Patent: Aug. 19, 2014

(54) EFFICIENT DATA BACKUP

(75) Inventors: Christopher Hercules Claudatos, San Jose, CA (US); Ajay Kushwah, San Ramon, CA (US); Kiran Bachu, Cupertino, CA (US)

(73) Assignee: EMC Corporation, Hopkinton, MA (US)

( * ) Notice: Subject to any disclaimer, the term of this patent is extended or adjusted under 35 U.S.C. 154(b) by 256 days.

(21) Appl. No.: 12/242,030

(22) Filed: Sep. 30, 2008

(51) Int. Cl.
*G06F 17/30* (2006.01)

(52) U.S. Cl.
USPC .......................................... 707/664; 707/692

(58) Field of Classification Search
USPC ......................................... 707/640, 664, 692
See application file for complete search history.

(56) References Cited

U.S. PATENT DOCUMENTS

| | | | |
|---|---|---|---|
| 7,472,242 B1 * | 12/2008 | Deshmukh et al. | 711/162 |
| 7,797,279 B1 * | 9/2010 | Starling et al. | 707/641 |
| 7,840,537 B2 * | 11/2010 | Gokhale et al. | 707/652 |
| 2005/0144254 A1 | 6/2005 | Kameda | |
| 2005/0257106 A1 | 11/2005 | Luby et al. | |
| 2006/0015581 A1 | 1/2006 | Breiter et al. | |
| 2007/0283438 A1 | 12/2007 | Fries et al. | |
| 2007/0288536 A1 | 12/2007 | Sen et al. | |
| 2009/0210412 A1 * | 8/2009 | Oliver et al. | 707/707 |
| 2009/0259701 A1 | 10/2009 | Wideman et al. | |
| 2010/0281067 A1 * | 11/2010 | Boldt et al. | 707/802 |

* cited by examiner

*Primary Examiner* — Robert Beausoliel, Jr.
*Assistant Examiner* — Alexandria Bromell
(74) *Attorney, Agent, or Firm* — Theodore A. Chen; Krishnendu Gupta

(57) ABSTRACT

A method, article of manufacture, and apparatus for efficiently backing up information is disclosed. In an embodiment, this comprises receiving data and analyzing the received data. In an embodiment, the data may be deduped. File headers, corresponding file metadata and corresponding file blocks are then created based on analyzing the data. In an embodiment, the data is discarded. The file headers, corresponding file metadata and corresponding file blocks are then organized into a self contained datastream. The self contained datastream is then stored in a storage device. File headers are used to indicate the start of a new file in the self contained datastream. File blocks contain the information necessary to reconstruct the files in the datastream. File metadata describes how to reconstruct the file, such as which file blocks are required for the file, and the location of each file block in the self contained datastream, among others.

8 Claims, 5 Drawing Sheets

EFFICIENT DATA BACKUP

FIELD OF THE INVENTION

The present invention relates generally to information backup systems, and more particularly, to systems and methods of efficiently backing up information.

BACKGROUND OF THE INVENTION

According to one estimate, the size of the digital universe in 2007 was two hundred eighty one billion gigabytes. The estimate goes on to note that the digital universe had a compound annual growth rate of almost sixty percent. With so much information being generated, the need for efficiently storing information is increasing.

Traditional ways of storing data have been to "backup" a copy of the data to a storage device. However, there is frequently a substantial amount of redundancy in the data that is stored in the storage device. For example, the data may have numerous copies of a file, or there may be minor modifications in the data between consecutive backups. Redundant data wastes storage capacity and unnecessarily consumes bandwidth. Thus, storing data would be more efficient if the data redundancy was removed.

There have been attempts to remove data redundancy. One approach is to divide the data into blocks, assign a unique signature to each block, and store the blocks and unique signatures in a hash table or image file. During subsequent backup operations, new data is divided into blocks, each block is assigned a signature, and the blocks and signatures are compared to previous ones to determine whether a block was previously stored. If an identical block or signature is found, the block is discarded; otherwise, the new block is stored. This is approach is commonly known as deduplication, or "deduping." Other approaches include storing the blocks in a binary tree and determining whether an incoming block should be stored by searching the binary tree.

While such approaches achieve some efficiency by not storing redundant data, it incurs significant disk overhead as a result of constantly accessing the disk to search for data blocks. Also, the searching techniques employed in existing systems often involve searching for the signature in a database, which becomes less efficient as the size of the database grows. There is a need, therefore, for an improved method, article of manufacture, and apparatus for backing up information.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
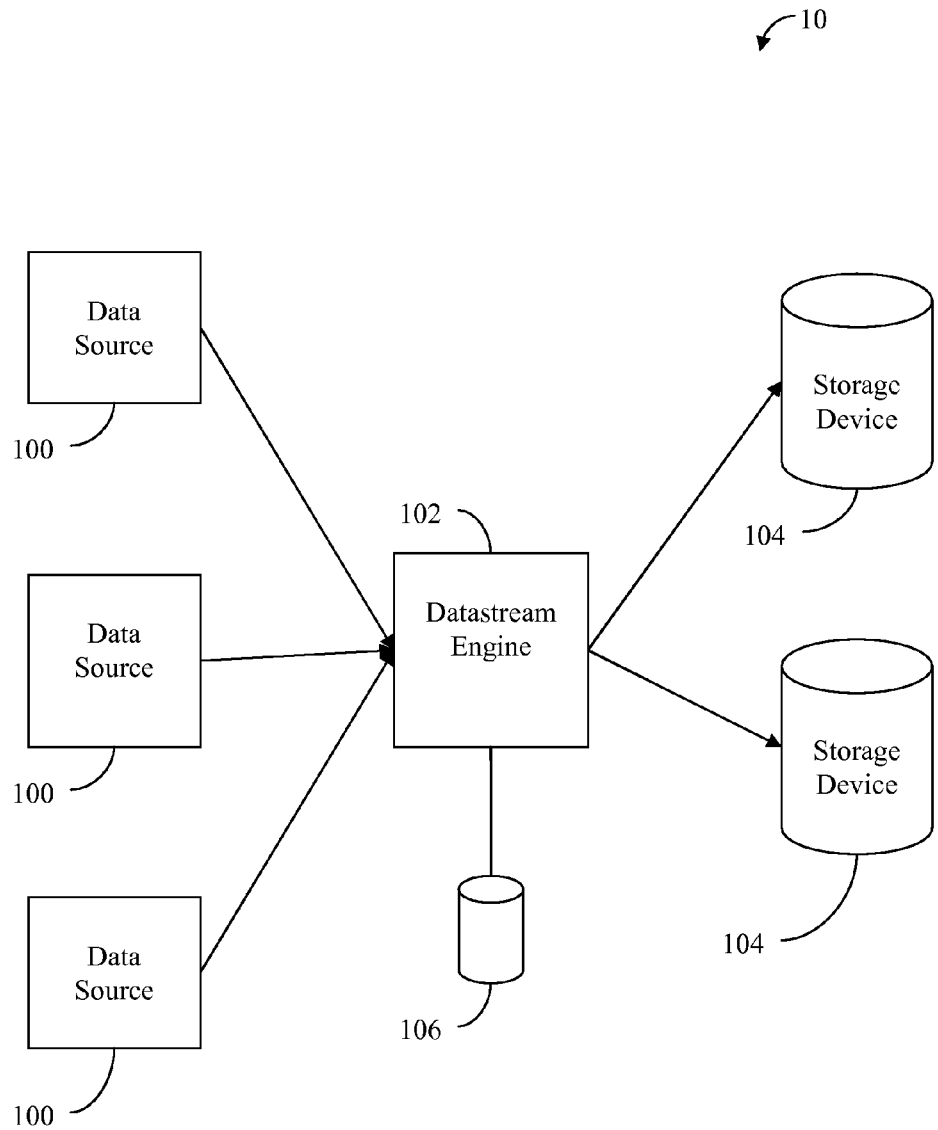
FIG. 1 is a diagram of an embodiment of a system in accordance with the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

An embodiment of the invention will be described with reference to a backup system in the form of a storage system configured to store files, but it should be understood that the principles of the invention are not limited to data storage systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Disclosed herein are a method and system to efficiently backup information. In particular, the foregoing will be described with respect to FIG. 1. A backup system 10 comprises data sources 100, datastream engine 102, and storage units 104. Data sources may be transitory or non-transitory. Transitory sources are sources in which the data is moving, such as network traffic. Non-transitory sources are sources in which the data is not moving, such as a disk drive or CD-ROM. As shown by a various storage device 106, any of the foregoing systems may include storage, such as for metadata or temporary storage. It should be understood that although an embodiment is being described as being used with tape drives, any type of storage may be used, such as disk drives, content addressable storage, flash memory, optical drives, CD-Recordable drives, DVD-Recordable drives, non-volatile storage, etc.

Figure 2:
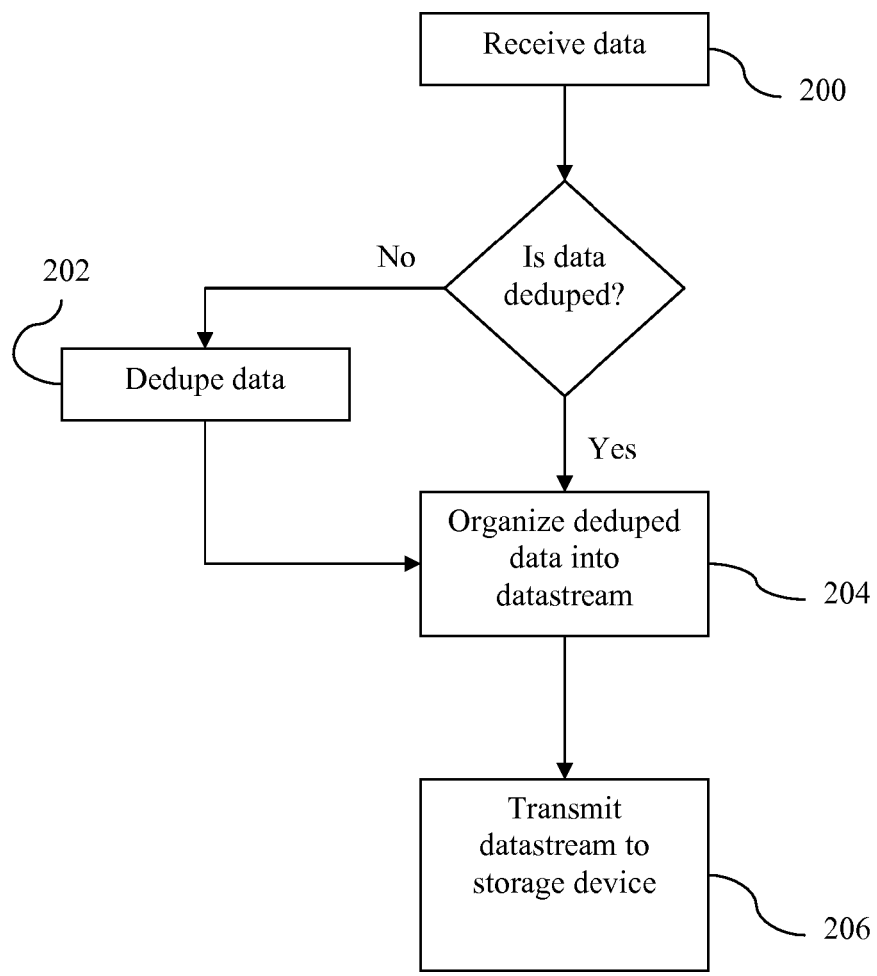
FIG. 2 is a flowchart illustrating a process for backing up information in some embodiments of the invention.

The method for saving data, illustrated in FIG. 2, comprises receiving data in step 200. The data may come from a variety of data sources, as illustrated in FIG. 1, and through a variety of mediums. In some embodiments, the data may come deduped via a network connection from the Avamar program, a software program provided by EMC Corporation. In some embodiments, the data may come from other sources. The data need not be deduped before being received by the present invention. Raw data may be deduped by the present invention, utilizing any dedupe method, step 202.

Deduped data, by its nature, is very fragmented. For example, to reconstruct file A, blocks 1, 3, 6, and 7 may be needed. To reconstruct file B, blocks 1, 2, 5, and 6 may be needed. However, blocks 1, 2, 3, 5, 6 and 7 may be located in completely different sections of the image. This fragmentation leads to high disk overhead, and is especially problematic in backup systems utilizing tape. Due to the nature of tape, it is expensive and inefficient to do a search for blocks which require multiple reads of the tape. Using the above example, suppose block 1 was at the end of the tape, block 3 was the second to last block, block 6 was the third to last block, and block 7 was the fourth to last block. This would require the backup system to read the entire tape four times to reconstruct File A. This problem may become worse if the blocks are spread across multiple tapes, resulting in a series of insertions and ejections of tapes.

To alleviate this problem, datastream engine 102 receives the deduped data and organizes it, step 204. In some embodiments, the hash IDs and blocks from the Avamar program are read. Using the hash IDs and blocks, datastream engine 102 organizes the deduped data into the datastream illustrated in FIG. 3.

Figure 3:
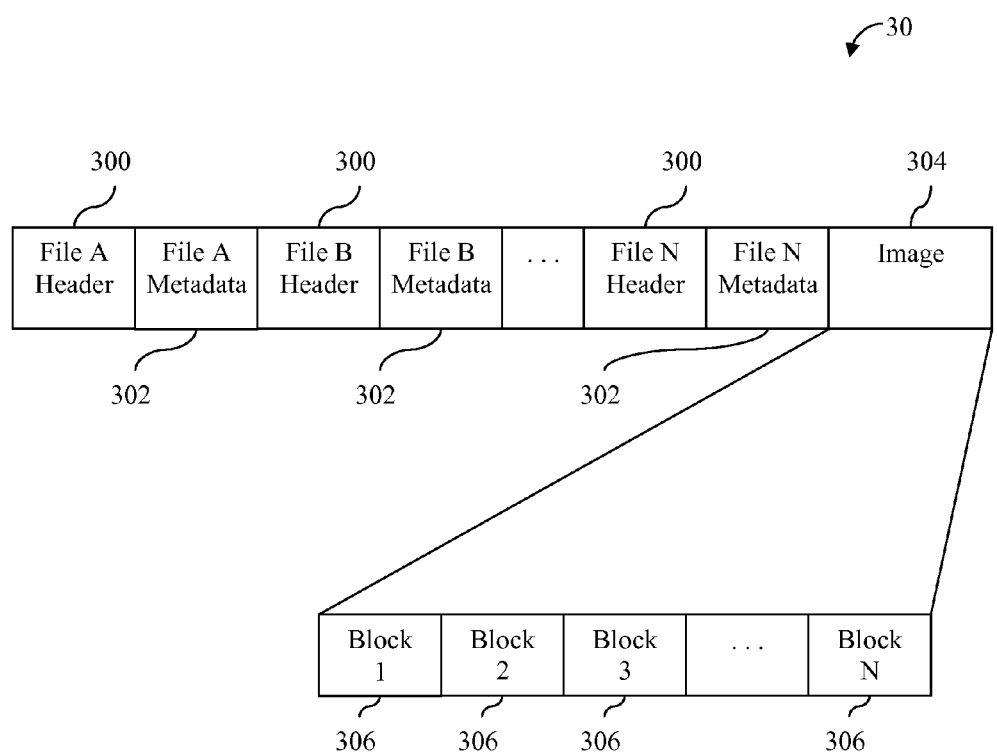
FIG. 3 is a diagram of a self-contained datastream in some embodiments of a system in accordance with the invention.

In FIG. 3, Datastream 30 contains File Headers 300, File Metadata 302, Image 304, and File Blocks 306. File Headers 300 are used to indicate the start of a new file in Datastream 30. Image 304 contains File Blocks 306 necessary to reconstruct the files in Datastream 30. File Metadata 302 contain information describing how to reconstruct the file, such as which File Blocks are required for the file, and the location of each File Block in the Datastream 30, among others.

Figure 5:
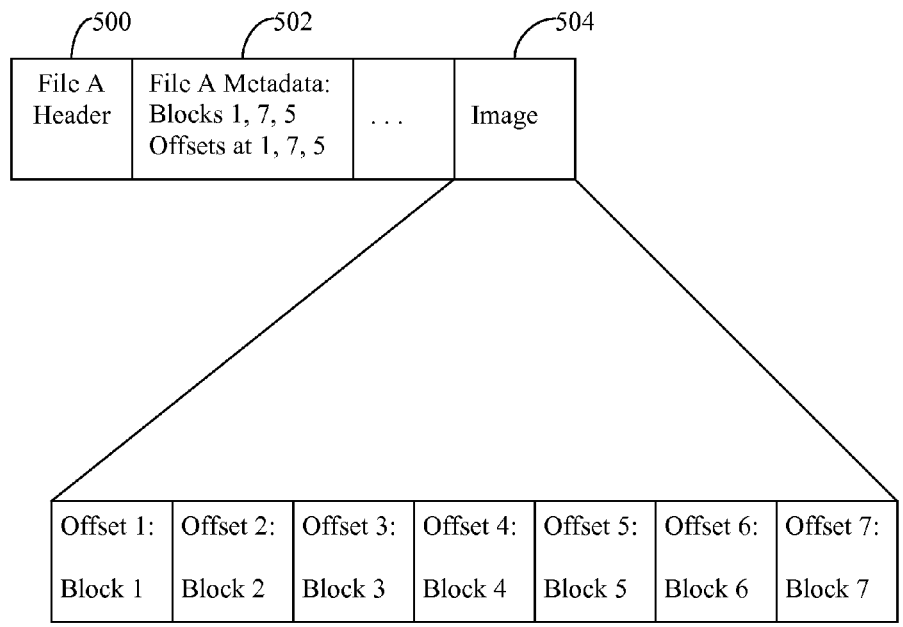
FIG. 5 is a diagram of a self-contained datastream in some embodiments of a system in accordance with the invention.

Having the blocks organized is useful in reducing overhead costs. It minimizes the number of times a backup system has to read the image to find a needed block. Furthermore, in conjunction with knowing where individual blocks are stored in the image, e.g. an offset, a more effective way to locate blocks in the image is provided. Take for example the self-contained datastream in FIG. 5. File A Header 500 indicates the start of a new file. File A Metadata 502 indicates File A requires blocks 1, 7, and 5 in Image 504. File A Metadata 502 would have additional information, such as an offset, which describes where specifically to find blocks 1, 7, and 5 in the image. The blocks would be read in the order 1, 5, 7 over the media but written in the file logical order of 1, 7, 5 at the destination. This allows rapid access to each block, and does not require multiple passes (back and forth movement of reading head) on the image to collect all the desired blocks.

In some embodiments, datastream engine 102 uses the hash IDs from the Avamar program to create the file metadata. Much like how the hash IDs inform Avamar which blocks are needed for a specific file, the metadata points to blocks in the image which are needed for a specific file.

In some embodiments, datastream engine 102 constructs the image by using the blocks found in the Avamar node. The blocks in the Avamar node can be reconstructed into files, and then broken down into blocks utilizing a different format to be stored in the image. Alternatively, the blocks in the Avamar node can be directly copied into the image in an organized manner.

In some embodiments, it may be beneficial to construct the datastream in a low-latency storage device, such as RAM, before transmitting the datastream to the final storage device. Such cases may be when only one file needs to be backed up, or when the datastream is not very large. In some embodiments, it may be necessary to construct the datastream in a high-latency storage device.

In step 206, the datastream is transmitted to storage units 106. As illustrated by FIG. 1, the datastream may be transmitted to multiple storage devices. In some embodiments, the storage device is a tape storage device.

By being organized and contained in only one datastream, the backup copy not only consumes fewer resources (storage capacity, bandwidth, etc.), but is also easier to restore.

The datastream is deduped and self-contained, meaning all the required components for a restore for any element are in the datastream yet, at the same time, there are not duplicate blocks in the data section. The file header indicates the start of a new file in a restore operation, the image contains the blocks needed to restore every file in the restore operation, and the file metadata indicates which blocks are needed for a particular file and where in the image each block is.

Since the datastream is self-contained and has all the components required for a restore, the original data may be discarded. However, in some embodiments, it may be desirable to retain the original data. For example, if the self-contained datastream was stored in a remote location, such as a tape warehouse, and the original data was an Avamar copy stored locally, it may be desirable to retain the original Avamar copy for quick access. In some embodiments, it may be impractical to discard the original data. For example, if the original data included program code for an application server, and the self-contained datastream was a once-a-week backup copy, it would be impractical to discard that data for the application server since it is in constant use.

Furthermore, since the datastream is organized before storing it on storage device 106, the restore operation would only need to analyze the datastream once. This allows for storing a deduped backup copy on tape. Typically, deduped data is not stored on tape, as the restore usually includes dumping the entire image on disk before searching the elements to restore. This means that to retrieve a single file or object, it would be necessary to restore the entire image (which could be many gigabytes in size) to disk and then use existing solutions to restore that single file or object. Other reasons for not storing deduped data on tape include the fragmented nature of deduped data as previously discussed. For example, if one file consisted of 100 blocks, it could potentially require recovery of 100 tapes. Datastream engine 102 minimizes the impact of fragmentation, and allows for a practical method to backup deduped data to tape.

Figure 4:
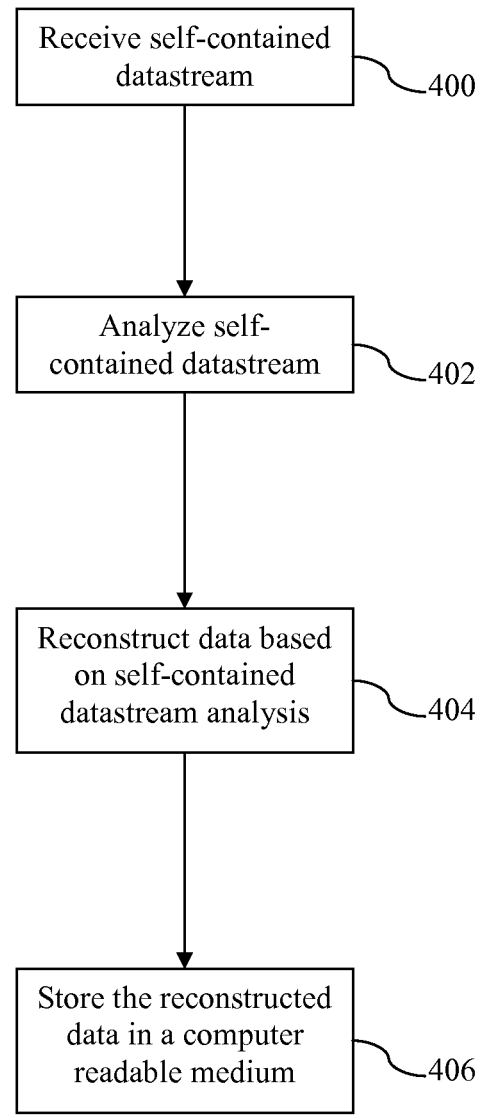
FIG. 4 is a flowchart illustrating a process for restoring information in some embodiments of the invention.

A method to restore data in some embodiments, illustrated by FIG. 4, comprises receiving a self-contained datastream in step 400, analyzing the self-contained datastream in step 402, reconstructing data based on the self-contained datastream analysis in step 404, and storing the reconstructed data in a computer readable medium in step 406. The datastream may be received from multiple locations. For example, if the datastream is very large, it may be stored across multiple tapes. In such a case, it may be desired to have multiple tape drives available so that there would be a minimal amount of tape "insert and eject."

Similarly, the reconstructed data may be stored in multiple locations. In some embodiments, the reconstructed data is stored on a server to replace a malfunctioning version. In some embodiments, multiple copies of the reconstructed data may be stored on multiple CD-ROMs for distribution.

In some embodiments, it may be unnecessary to restore the entire datastream. For example, one datastream may contain a backup of an email server. The datastream may contain thousands of emails. Some emails may contain very important discussions between executives, which may be the target of the recovery. Other emails may contain information about a holiday party, which may not need to be restored. In such a case, it may be beneficial and more efficient to restore only certain files. In some embodiments, the backup system can review a list of file headers and specify which file headers to skip during a restore operation. By skipping file headers, the associated file metadata and associated data blocks are also skipped. This can result in considerable savings of time and bandwidth for the restore operation.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for processing data comprising:
   receiving data, wherein the received data is deduped;
   analyzing the data, wherein the data that has been deduplicated is analyzed for organizing the data into a self-contained datastream;
   creating file headers, corresponding file metadata based on a hash generated by a backup application, and corresponding file blocks based on analyzing the data, wherein creating the corresponding file metadata includes generating an offset to indicate location of a data block;
   organizing, in a low-latency cache, the file headers, corresponding file metadata, and corresponding file blocks into the self-contained datastream, wherein the corresponding file blocks are organized into the self-contained datastream based on an order indicated by offset information included in the corresponding file metadata, wherein:
   the file headers indicate a start of a file in the self-contained datastream;
   the corresponding file metadata includes location information for the corresponding file blocks; and
   the corresponding file blocks are organized in an image section and includes file blocks necessary to recover the file;
   the corresponding file blocks are organized in sequential order to reduce a number of disk reads, wherein the corresponding file blocks include deduplicated blocks;
   storing the self-contained datastream in a storage device;
   reading the datastream in a first sequence; and
   writing data based on the read datastream in a second sequence.

2. The method as recited in claim 1, further comprising discarding the data.

3. The method as recited in claim 1, further comprising retaining the data.

4. The method as recited in claim 1, wherein creating the file metadata includes generating an offset to indicate where a data block is in the self-contained datastream.

5. The method as recited in claim 1, wherein receiving data includes receiving data from multiple sources.

6. The method as recited in claim 1, wherein receiving data includes receiving data from a non-transitory source.

7. A system for processing data, comprising:
   a storage device; and
   a processor configured to:
   receive data, wherein the received data is deduped;
   analyze the data, wherein the data that has been deduplicated is analyzed for organizing the data into a self-contained datastream;
   create file headers, corresponding file metadata based on a hash generated by a backup application and corresponding file blocks based on the data analysis, wherein create the corresponding file metadata includes generating an offset to indicate location of a data block;
   organize, in a low-latency cache, the file headers, corresponding file metadata and file blocks into the self-contained datastream, wherein the corresponding file blocks are organized into the self-contained datastream based on an order indicated by offset information included in the corresponding file metadata, wherein:
   the file headers indicate a start of a file in the self-contained datastream;
   the corresponding file metadata includes location information for the corresponding file blocks; and
   the corresponding file blocks are organized in an image section and includes file blocks necessary to recover the file;
   the corresponding file blocks are organized in sequential order to reduce a number of disk reads, wherein the corresponding file blocks include deduplicated blocks;
   store the datastream in the storage device;
   read the datastream in a first sequence; and
   write data based on the read datastream in a second sequence.

8. A computer program product for saving data, comprising a non-transitory computer readable medium having program instructions embodied therein for:
   receiving data, wherein the received data is deduped;
   analyzing the data, wherein the data that has been deduplicated is analyzed for organizing the data into a self-contained datastream;
   creating file headers, corresponding file metadata based on a hash generated by a backup application, and corresponding file blocks based on the data analysis, wherein creating the corresponding file metadata includes generating an offset to indicate location of a data block;
   organizing, in a low-latency cache, the file headers, corresponding file metadata, and corresponding file blocks into the self-contained datastream, wherein the corresponding file blocks are organized into the self-contained datastream based on an order indicated by offset information included in the corresponding file metadata, wherein:
   the file headers indicate a start of a file in the self-contained datastream;

the corresponding file metadata includes location information for the corresponding file blocks; and the corresponding file blocks are organized in an image section and includes file blocks necessary to recover the file;

the corresponding file blocks are organized in sequential order to reduce a number of disk reads, wherein the corresponding file blocks include deduplicated blocks;

storing the datastream in a storage device;

reading the datastream in a first sequence; and writing data based on the read datastream in a second sequence.

\* \* \* \* \*